July 28, 1942.  L. M. PERSONS  2,291,504
DIAPHRAGM CUT-OFF VALVE
Filed Jan. 3, 1939    3 Sheets-Sheet 1
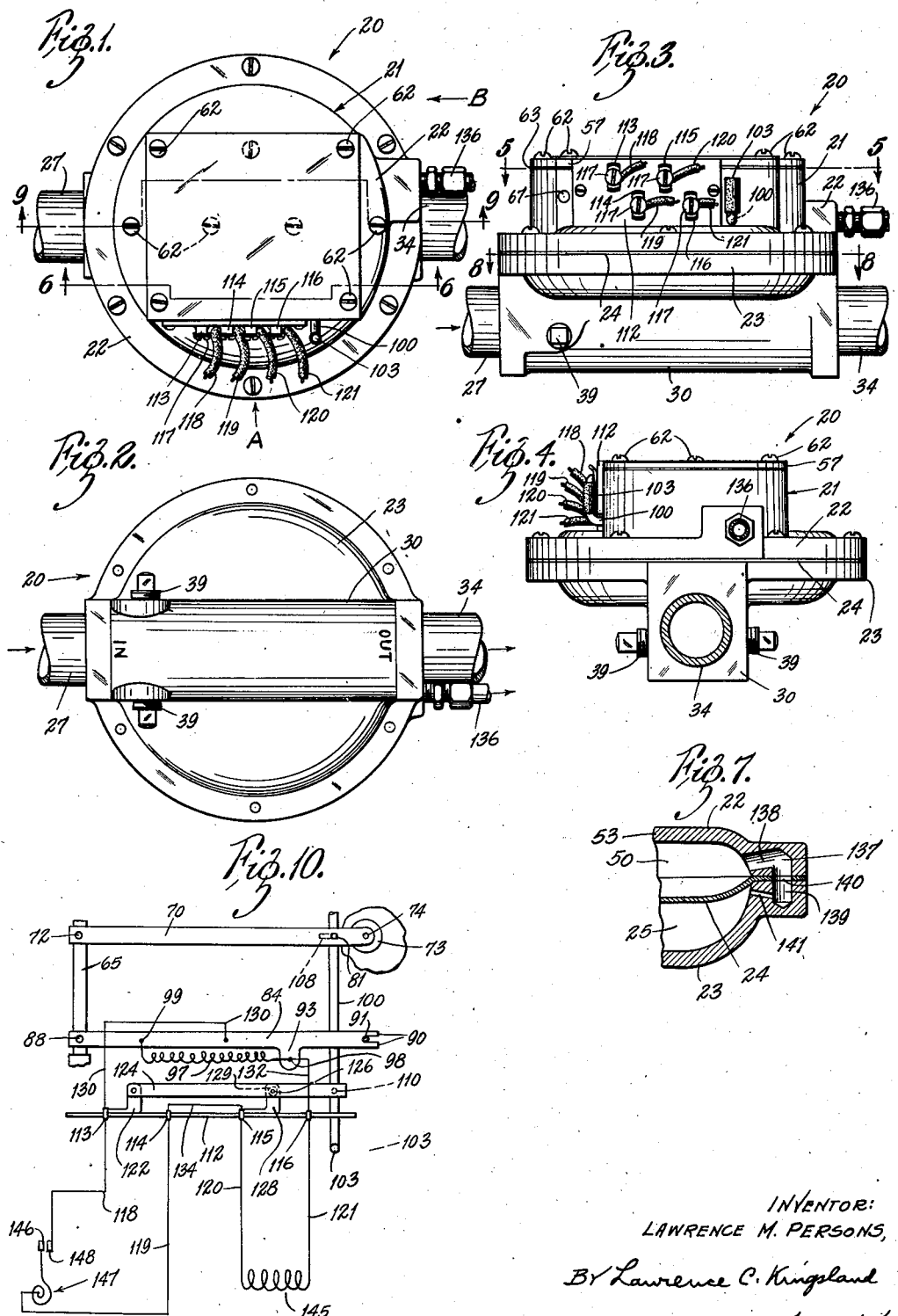
INVENTOR:
LAWRENCE M. PERSONS,
By Lawrence C. Kingsland
ATTORNEY.

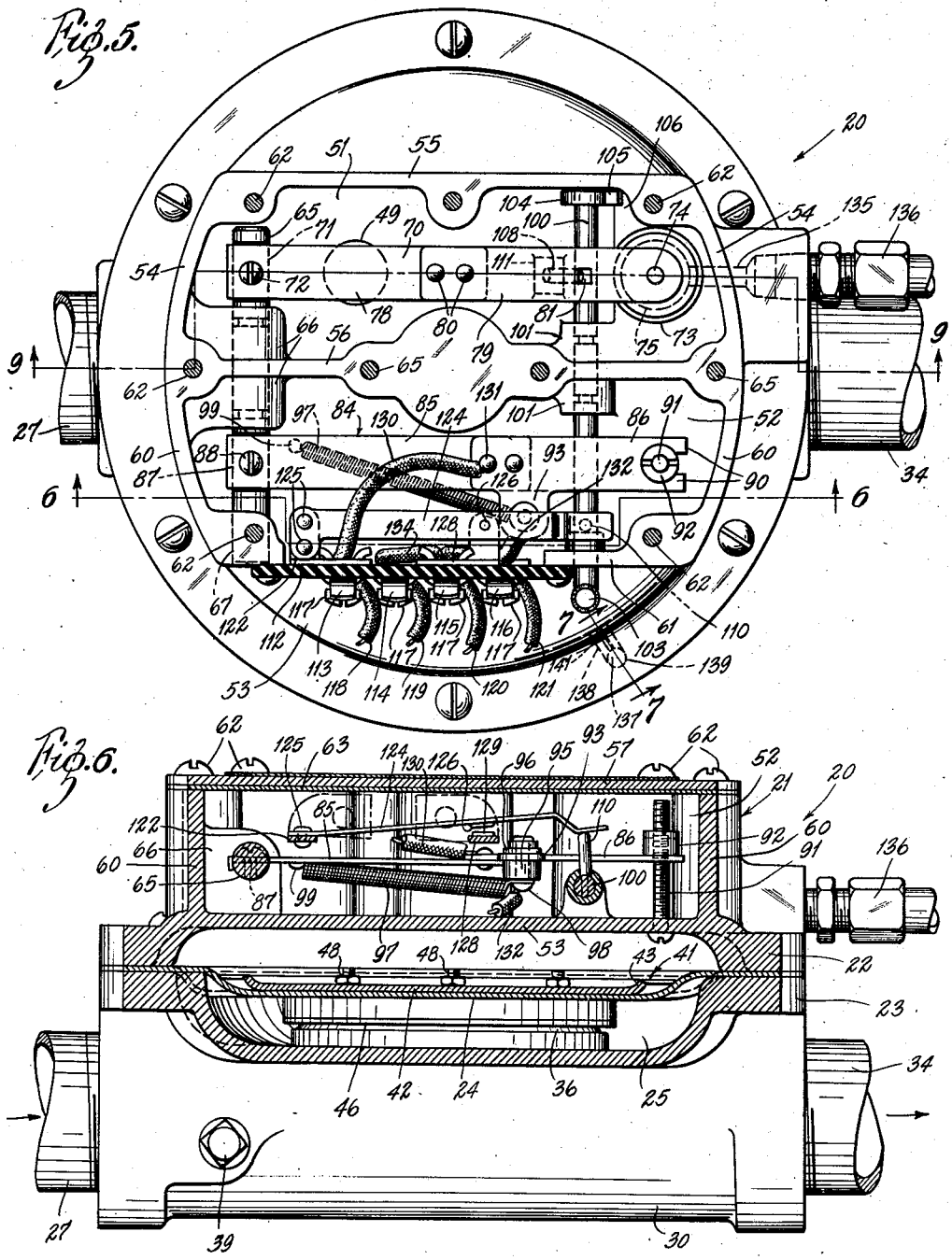

July 28, 1942. L. M. PERSONS 2,291,504
DIAPHRAGM CUT-OFF VALVE
Filed Jan. 3, 1939 3 Sheets-Sheet 3
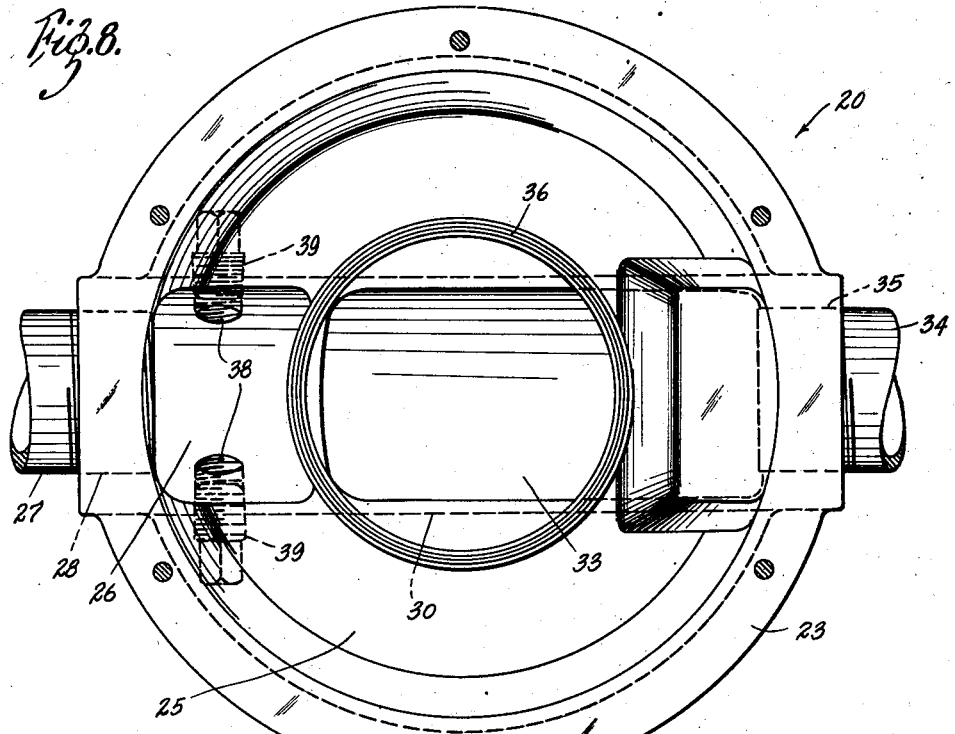
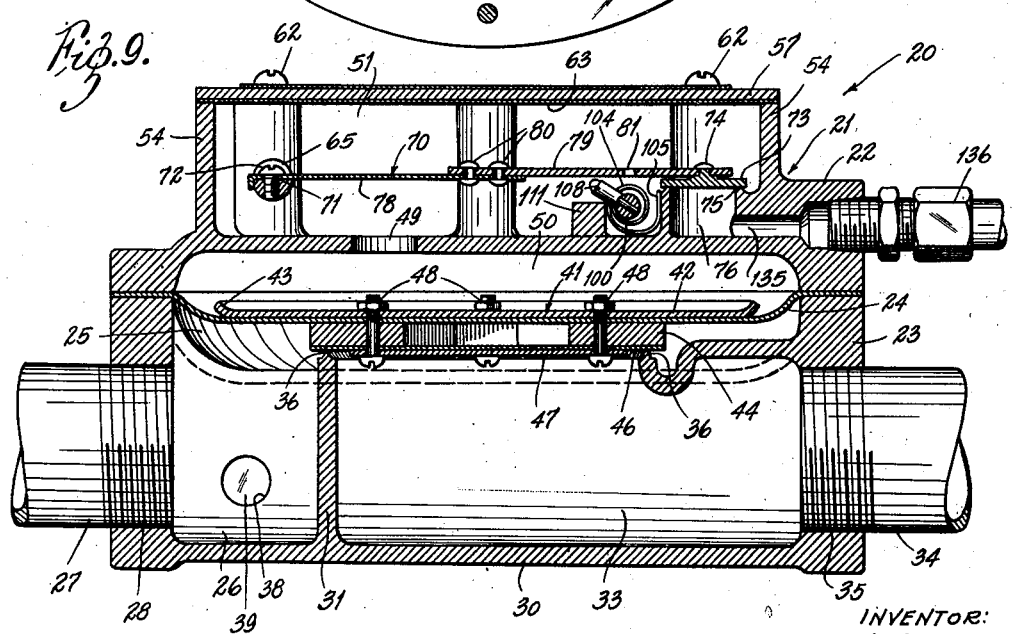
INVENTOR:
LAWRENCE M. PERSONS,
By Lawrence C. Kingsland
ATTORNEY.

Patented July 28, 1942

2,291,504

UNITED STATES PATENT OFFICE 2,291,504

DIAPHRAGM CUTOFF VALVE

Lawrence M. Persons, St. Louis County, Mo., assignor to Automatic Control Corporation, St. Louis, Mo., a corporation of Delaware Application January 3, 1939, Serial No. 249,031

8 Claims. (Cl. 137—139)

The present invention relates generally to valves, and more particularly to electrically-actuated diaphragm on-and-off gas valves.

An object of the present invention is to provide a novel electrically-actuated diaphragm on-and-off valve.

Another object is to provide a novel electrically-actuated diaphragh on-and-off valve which includes manual means for throwing into operation the electrical actuating means.

Another object is to provide a novel on-and-off gas valve which includes novel electrical actuating means.

Another object is to provide a novel on-and-off gas valve which is adapted to be opened upon the closing of an electric circuit either by a thermostat or manually.

Another object is to provide a novel on-and-off gas valve which includes electrical actuating means adapted to be manually energized and automatically deenergized.

Another object is to provide a simple, compact and sturdy electrically-controlled diaphragm on-and-off gas valve which is adapted to fulfill all of the objects and advantages sought therefor.

Other objects and advantages will be apparent from the following description, taken in conjunction with the accompanying drawings, in which:

Fig. 1 is a plan view of a valve constructed in accordance with the teachings of the present invention;

Fig. 2 is a bottom view of the valve shown in Fig. 1;

Fig. 3 is a side view of the valve shown in Fig. 1, looking in the direction of the arrow A;

Fig. 4 is an end view of the valve shown in Fig. 1, looking in the direction of the arrow B;

Fig. 5 is a section on the line 5—5 of Fig. 3;

Fig. 6 is a section on the line 6—6 of Figs. 1 and 5;

Fig. 7 is a section on the line 7—7 of Fig. 5;

Fig. 8 is a section on the line 8—8 of Fig. 3;

Fig. 9 is a section on the line 9—9 of Figs. 1 and 5; and

Fig. 10 is a diagrammatic view of the electrical connections and the movable parts of the valve directly associated therewith.

Referring to the drawings more particularly by reference numerals, 20 indicates generally a valve constructed in accordance with the concepts of the present invention. The valve 20 includes a casing 21 comprising an upper section 22 and a lower section 23, between the adjacent peripheries of which is a flexible diaphragm 24.

The lower section 23 of the casing 21 is generally circular in plan view (Fig. 8) and includes a bowl-shaped chamber 25 into which leads an inlet chamber 26. A gas pipe section 27 (Figs. 8 and 9) leads into the inlet chamber 26 through an aperture 28 in a wall of the lower section 23. The inlet chamber 26 is defined by a portion of an elongated conduit 30 (Figs. 3 and 4) disposed beneath the lower defining wall of the chamber 25 and formed integral therewith. A wall 31 (Fig. 9) separates the inlet chamber 26 from an elongated outlet chamber 33 into which extends a pipe section 34 through an opening 35 in a wall of the lower section 23. A valve seat 36 of circular configuration is disposed centrally of the chamber 25 and defines an opening leading from the chamber 25 into the outlet chamber 33. Clean-out or inspection openings 38 in opposed walls of the inlet chamber 26 are closed by removable threaded plugs 39.

The diaphragm 24 supports a valve 41 which is adapted to seat on the valve seat 36 (Figs. 6 and 9). The valve 41 includes a large metal disc 42 having a turned-up periphery 43 which is disposed against the upper surface of the diaphragm 24. An annular member 44 is disposed against the under surface of the diaphragm 24. A resilient disc 46 is disposed against the side of the member 44 remote from the diaphragm 24, being maintained in position by a small disc 47. Nut and bolt assemblages 48 maintain the plates 42 and 47, the member 44, and the resilient disc 46 in assembled relation with the diaphragm 24. It is evident that the valve 41 when seated closes off the inlet chamber 26 and the chamber 25 from the outlet sump 33.

The upper section 22 of the casing 21 includes a lower chamber 50 (Fig. 6), the lower wall of which is defined by the diaphragm 24 when the valve 20 is in assembled relation, and upper chambers 51 and 52 (Fig. 5). The lower chamber 50 is separated from the upper chambers 51 and 52 by a horizontal wall 53 (Fig. 6), an opening 49 providing communication between chambers 50 and 51. The upper chamber 51 is defined by end walls 54, an exteriorly disposed side wall 55, an interiorly disposed side wall 56, a portion of the wall 53, and a portion of a cover plate 57. The chamber 52 is defined by end walls 60, which are a continuation of the end walls 54, an exteriorly disposed side wall 61, the interiorly disposed wall 56, a portion of the wall 53, and a portion of the cover plate 57. The cover plate 57 is removably secured to the vertical defining walls of the chambers 51 and 52 by screws 62, being sealed in respect to the aforesaid walls by a gasket 63.

A shaft 65 is journaled in an enlargement 66 formed integral with the common wall 56, and extends across one end of the chambers 51 and 52. An aperture 67 is provided in the wall 61 (Figs. 3 and 5) for the insertion of the shaft 65 therethrough into its journaled relation with the enlargement 66. A lever 70 is fixed to a flattened portion 71 of the shaft 65 by a screw 72, being disposed in the chamber 51. A disc valve 73 is loosely connected to the free end of the lever 70 by an integral projection 74, or the like (Fig. 9). The valve 73 cooperates with a valve seat 75 which leads to a passage 76. The lever 70 is of bisectional construction and includes the two sections 78 and 79 (Fig. 9) connected by rivets 80, or the like. The section 79 includes an opening 81 for a purpose to be described.

A heat expansible strip 84 of sectional construction, including sections 85 and 86 (Figs. 5 and 6), is fixed to another flattened portion 87 of the shaft 65 by a screw 88, being disposed in chamber 52. The free end of the section 86 is bifurcated to form legs 90 which straddle a screw 91 extending vertically from the horizontal wall 53. An adjustable rider 92 threadedly engages the screw 91 and abuts the legs 90. The section 86 of the bimetallic strip 84 also includes a lateral projection 93. An insulator 95 is connected to the projection 93, a reduced portion thereof extending through an aperture in the projection 93 and being held in position by a resilient ring 96 engaged in a groove in the insulator 95. A heater coil 97 has one end secured to the insulator 95 by a rivet 98, the other end of the heater coil 97 being soldered at 99 to the heat expansible strip 84.

A shaft 100 (Fig 5) is journaled in an enlargement 101 formed integral with the common wall 56. The shaft 100 extends through an aperture in the wall 61 and terminates exteriorly of the chamber 52 in a handle portion 103. The shaft 100 extends beneath the lever 70 and the bimetallic member 84 and extends across the ends of the chambers 51 and 52 remote from the shaft 65. A spring 104 is fixed to the interiorly disposed end of the shaft 100, the free end 105 of the spring 104 being crimped over a shoulder 106. The spring 104 biases the shaft 100 into the position shown in Fig. 5. A pin 108 is fixed to the shaft 100 beneath the lever 70 and includes a reduced free end which is adapted to move into the opening 81 upon manual rotation of the shaft 100. A second pin 110 (Fig. 6) is fixed to the shaft 100 adjacent the wall 61 for a purpose to be described. A stop 111 (Fig. 9) formed integral with the wall 53 is engageable by the pin 108 to limit the counterclockwise rotation of the shaft 100.

A panel 112 of insulative material (Figs. 3 and 5) is fixed to the wall 61 in a manner to close a space in the wall 61. Four terminal posts 113, 114, 115, and 116 are fixed to the panel 112 and extend therethrough. A screw 117 is associated with each of the terminal posts 113, 114, 115, and 116, which secure exteriorly disposed leads 118, 119, 120, and 121 (Fig. 3) to the aforesaid contacts, respectively.

An angle extension 122 is connected to the terminal post 113 within the chamber 52, and supports a resilient switch blade 124 fixed thereto by rivets 125, or the like. The switch blade 124 extends parallel with the panel 112 and overlies to normally contact the pin 110 (Fig. 6).

Midway between the ends of the blade 124 there is fixed thereto a contact 126. An angle extension 128 is fixed to the terminal post 115 within the chamber 52, and supports a contact 129 in a position to be engaged by the contact 126.

A lead 130 has one end fixed by a rivet 131, or the like, to the heat expansible member 84 and the other end to the extension 122. A lead 132 has one end connected to the heater coil 97 by the rivet 98 and the other end to the terminal post 116. A lead 134 has one end connected to the terminal post 115 and the other end to the terminal post 114.

The afore-mentioned passage 76 (Fig. 9) communicates with a passage 135. The passage 135 includes an enlargement which opens exteriorly of the valve 20 and threadedly receives a pilot light connection 136.

The chamber 50 is at all times in seepage communication with the chamber 25 through a bypass 137. The bypass 137 includes a passage 138 (Fig. 7), which leads from the chamber 50 into a defining wall, a communicating passage 139 in a defining wall of the chamber 25, there being a suitable aperture 140 in the diaphragm 24 to permit communication, and a small passage 141 which leads from the passage 139 into the chamber 25.

In Fig. 10 there is shown diagrammatically the electrical actuating mechanism and the associated movable elements. The leads 120 and 121 are connected to a secondary 145 of a transformer, the primary of which is not shown. The lead 119 is connected to a movable contact 146 of a room thermostat 147. The lead 118 is connected to a fixed contact 148 of the thermostat 147. The remaining details of Fig. 10 are sufficiently described above so that additional detailed explanation here is unnecessary for a clear understanding of the disclosure.

*Operation*

In the typical installation, the gas valve 20 is located in a gas line leading to the gas burner of a heating plant. The terminals 113, 114, 115, and 116 are connected to a transformer and to a room thermostat as indicated in Fig. 10.

If it be assumed that the thermostat 147 is in the open or non-heat demand relation illustrated in Fig. 10, then the valve 73 is in engagement with its seat 75 (Fig. 9) and the valve 41 is in engagement with its seat 36, omitting consideration of the transition period positions of the elements of the gas valve 20. The chamber 50 and the chamber 25 are filled with gas at substantially the same pressure, the gas passing into the chamber 50 from the chamber 25 by means of the bypass 137 (Fig. 7) and being retained in the chamber 50 and the superposed chamber 51 by the closed valve 73. With gas above and below the diaphragm 24, therefore, at substantially the same pressure, the valve 41 remains closed through the effect of its own weight.

When the temperature of the space in which the thermostat 147 is located falls to a predetermined degree, the movable contact 146 closes with the fixed contact 148 (Fig. 10), which closes an electrical circuit from the fixed contact 148 consecutively through the lead 118, the terminal post 113, the extension 122, the lead 130, the heat expansible member 84, the heater coil 97, the lead 132, the terminal post 116, the lead 121, the transformer secondary 145, the lead 120, the terminal post 115, the lead 134, the terminal post 114, the lead 119, and back to the movable contact 146. The closing of the afore-enumerated circuit causes the heater coil 97 to heat up. The heat expansible member 84 is affected by the heat from the heater coil 97 and bows upwardly (Fig. 6), thereby rotating the shaft 65 counter-clockwise. The bowing of the heat expansible member 84 is caused by its elongation resultant of the heat thrown off by the heating coil 97 and the blocking of simple longitudinal elongation by the anchorage of the member 84 to the shaft 65 and the abutment of the bifurcated end thereof against the screw 91. An initial upward bias prevents downward bowing of the heat expansible member 84. The rotation of the shaft 65, as stated, pivots the lever 70 counter-clockwise (Fig. 9), thereby raising the valve 73 from its valve seat 75. As the valve 73 is raised from its valve seat 75, gas within the chamber 51 and the chamber 50 escapes by way of the passage 76, the passage 135, the pilot light connection 136, and the pilot line to the pilot flame, since the gas under pressure follows the path of least resistance to atmosphere. The additional gas received by the pilot flame sufficiently enlarges the flame so that the adjacent burner will be ignited readily when gas is admitted to it.

As the gas in the chambers 50 and 51 escapes to atmosphere, the pressure in the chamber 50 becomes less than the pressure in the chamber 25, whereupon the diaphragm 24 is forced upwardly (Fig. 9) to raise its associated valve 41 from the valve seat 36. Gas then passes from the inlet chamber 26 and the chamber 25 into the outlet chamber 33, whence it passes to the main burner by a suitable piping.

The main burner continues to function to provide heat for the space occupied by the thermostat 147 until the temperature of the space reaches a point effecting separation of the movable contact 146 from the fixed contact 148. This separation, of course, breaks the electrical circuit and the reverse action to that set out above takes place. The valve 41 does not close immediately upon the separation of the contacts 146 and 148, but does in due course, following the functioning of the various elements of the valve 20.

Provision has been made for the manual closing of the electrical circuit in order to ignite the main burner under certain conditions which may conceivably arise. The shaft 100 with its handle 103 is normally in the position shown in Fig. 5 with the pin 110 beneath the free end of the blade 124 (Fig. 6) and the pin 108 in the posiiton shown in Fig. 9. The contacts 126 and 129 are, therefore, in open relation. When the shaft 100 is moved clockwise (Fig. 6), the pin 110 is moved out of contact with the free end of the blade 124, whereupon the contacts 126 and 129 engage. Simultaneously, the pin 108 is moved into engagement with the lever 70 which is thereby pivoted counterclockwise (Fig. 9) to raise the valve 73 from its seat 75. The reduced end of the pin 108 holdingly engages the opening 80 and prevents a return counterclockwise movement of the shaft 100 which would normally be effected by the spring 104. Gas in the chambers 51 and 50 immediately exhausts into the pilot flame, whereupon the pressure of the gas beneath the diaphragm 24 forces the diaphragm 24 upwardly (Fig. 9) to unseat the valve 41. Gas in the main line then passes to the burner which is ignited by the pilot flame.

A closing of the contacts 126 and 129 completes an electrical circuit (Fig. 10) from the fixed contact 129 successively through the extension 128 which supports the fixed contact 129, the terminal post 115, the lead 120, the transformer secondary 145, the lead 121, the terminal post 116, the lead 132, the heating coil 97, the heat expansible member 84, the lead 130, the terminal post 113, the extension 122, the blade 124, and back to the movable contact 126. The heat expansible member 84 bows in the manner set forth above from heat generated by the heating coil 97. The bimetallic member 84 continues to bow until the shaft 65 pivots counterclockwise (Fig. 9) sufficiently to release the pin 108 from engagement with the opening 80, whereupon the spring 104 pivots the shaft 100 counterclockwise, forcing the pin 110 under the free end of the blade 124 to break the contacts 126 and 129.

If the thermostat 147 has not meanwhile acted to close the contacts 146 and 148, the valve 41 is closed in a reverse manner to that set forth for the opening thereof, since the heat expansible member 84 will cool to reseat the valve 73. If, however, the contacts 146 and 148 have meanwhile been closed, the heat expansible member 84 will continue in a bowed position through the effect of this thermostat circuit until the opening of the aforesaid contacts 146 and 148.

It is, of course, contemplated that the particular shape of the valve casing 21 and other elements of the valve 20 may be varied within the scope of the claims which limit the present invention. The several elements of the valve 20 are constructed of materials suitable to insure efficient functioning thereof.

It is apparent that there has been provided an on-and-off gas valve of the diaphragm type which is adapted to fulfill all of the objects and advantages sought therefor.

It is to be understood that the foregoing description and accompanying drawings have been given by way of illustration and example and not for purposes of limitation, the invention being limited only by the claims which follow.

What is claimed is:

1. A mechanism for controlling a diaphragm valve having a chamber communicating with the side of the diaphragm remote from the normal gas passage comprising electrically controlled means adapted to be disposed in said chamber including a journaled shaft, a lever fixed to said shaft having a valve at the free end thereof, said valve being adapted to cooperate with a valve seat initiating a passage leading to the exterior of the casing, a heat expansible member fixed to said shaft, and a heating coil disposed adjacent said heat expansible member, said heat expansible member being adapted to pivot said shaft upon the heating of the heating coil to pivot the lever to unseat the associated valve.

2. A mechanism for controlling a diaphragm valve having a first chamber communicating with the side of the diaphragm remote from the normal gas passage and a second chamber adjacent said first chamber sealed from the gas comprising manually actuatable means adapted to be disposed in said first chamber including a rotatable shaft, a lever fixed to the shaft having a valve adjacent the free end, said valve being cooperatively disposed relative to a seat which initiates a passage leading from the casing to the outside, electro-thermal means in said second chamber for opening and closing said valve, and a second pivotally mounted shaft manually actuatable extending beneath the lever, said second shaft including a projection adapted to engage the lever upon rotation of the second shaft to pivot the lever to raise the valve from its associated seat.

3. A mechanism for controlling a diaphragm valve having a first chamber communicating with the side of the diaphragm remote from the normal gas passage and a second chamber adjacent said first chamber sealed from the gas comprising manually actuatable means adapted to be disposed in said first chamber including a rotatable shaft, a lever fixed to the shaft having a valve adjacent the free end, said valve being cooperatively disposed relative to a seat which initiates a passage leading from the casing to the outside, electro-thermal means in said second chamber for opening and closing said valve, a second pivotally mounted shaft manually actuatable extending beneath the lever, said second shaft including a projection adapted to engage the lever upon manual rotation of the second shaft to pivot the lever to raise the valve from its associated seat, and means for automatically releasing the projection from engagement with its lever.

4. A mechanism for controlling a diaphragm valve having a chamber communicating with the side of the diaphragm remote from the normal gas passage comprising electrically controlled means adapted to be disposed in said chamber including a journaled shaft, a lever fixed to said shaft having a valve at the free end thereof, said valve being adapted to cooperate with a valve seat initiating a passage leading to the exterior of the casing, a heat expansible member fixed to said shaft, and a heating coil disposed adjacent said heat expansible member, said heat expansible member being adapted to pivot said shaft upon the heating of the heating coil to pivot the lever to unseat the associated valve, a second shaft journaled in said casing extending beneath said lever including a projection adapted to contact the lever and to raise its associated valve upon pivotal movement of said second shaft, a switch blade and an associated contact, said second shaft including a second projection adapted to maintain said switch blade and associated contact in break relation when said first projection is out of engagement with said lever, said heating coil being electrically connected with said switch blade and associated contact.

5. A mechanism for controlling a diaphragm valve comprising a valve disposed in a chamber communicating with one side of the diaphragm, said valve in open position exhausting the chamber to atmosphere through a conduit leading from the chamber thereto, a heat expansible element, a shaft pivotally mounted in the chamber, a fixed connection between the shaft and an arm supporting the valve, a fixed connection between the shaft and the heat expansible element, and means for effecting movement of the heat expansible element to pivot the shaft.

6. A mechanism for controlling a diaphragm valve having a first chamber communicating with the side of the diaphragm remote from the normal gas passage and a second chamber adjacent said first chamber sealed from the gas comprising a valve adapted to be disposed in said first chamber adapted to close in one extreme position of movement a passage leading from the chamber to atmosphere, a shaft pivotally mounted in the chamber, an arm fixed to said shaft and connected to said valve, electro-thermal means in said second chamber for opening and closing said valve, a second shaft pivoted in the chamber and extending exteriorly thereof, said second shaft extending beneath said arm, a projection on said second shaft disposed beneath the said arm and adapted to move the arm and therethrough the valve from its seat upon rotation of said second shaft, and means for automatically restoring said second shaft to its initial position to permit the valve to close.

7. A mechanism for controlling a diaphragm valve having a chamber communicating with the side of the diaphragm remote from the normal gas passage comprising a valve adapted to be disposed in said chamber adapted to close in one extreme position of movement a passage leading from the chamber to atmosphere, electro-thermal means for raising said valve from its seat, manual means for moving said valve from its seat, said electro-thermal means including a heat expansible member adapted to positively move said valve from its seat, said heat expansible member being adapted to positively return said valve to its seat after having been raised either through the electro-thermal means or the manual means.

8. A mechanism for controlling a diaphragm valve having a first chamber communicating with the side of the diaphragm remote from the normal gas passage and a second chamber adjacent said first chamber sealed from the gas comprising a valve adapted to be disposed in said first chamber adapted to close in one extreme position of movement a passage leading from the chamber to atmosphere, and electro-thermal means including thermally actuatable means and cooperating electrically actuated heat giving means disposed in said second chamber for opening and closing said valve.

LAWRENCE M. PERSONS.